(12) United States Patent
Hato et al.

(10) Patent No.: US 12,109,736 B2
(45) Date of Patent: Oct. 8, 2024

(54) MOLDED ARTICLE MANUFACTURING METHOD

(71) Applicant: KYORAKU CO., LTD., Kyoto (JP)

(72) Inventors: Hisanao Hato, Yamato (JP); Tadatoshi Tanji, Yamato (JP); Shingo Nagashima, Kakamigahara (JP)

(73) Assignee: KYORAKU CO., LTD., Kyoto (JP)

( * ) Notice: Subject to any disclaimer, the term of this patent is extended or adjusted under 35 U.S.C. 154(b) by 251 days.

(21) Appl. No.: 17/767,201

(22) PCT Filed: Oct. 26, 2020

(86) PCT No.: PCT/JP2020/040093
§ 371 (c)(1),
(2) Date: Apr. 7, 2022

(87) PCT Pub. No.: WO2021/085373
PCT Pub. Date: May 6, 2021

(65) Prior Publication Data
US 2022/0371231 A1 Nov. 24, 2022

(30) Foreign Application Priority Data

Oct. 31, 2019 (JP) .................................. 2019-198808
Feb. 10, 2020 (JP) .................................. 2020-020864

(51) Int. Cl.
*B29C 37/02* (2006.01)
*B29C 37/00* (2006.01)

(52) U.S. Cl.
CPC .......... *B29C 37/02* (2013.01); *B29C 2037/90* (2013.01)

(58) Field of Classification Search
CPC ...................................................... B29C 49/72
See application file for complete search history.

(56) References Cited

FOREIGN PATENT DOCUMENTS

| CN | 104786404 A | * | 7/2015 |
| JP | H03-118623 U | | 12/1991 |

(Continued)

OTHER PUBLICATIONS

International Search Report issued on Dec. 15, 2020 in corresponding International application No. PCT/JP2020/040093; 4 pages.

(Continued)

*Primary Examiner* — Alison L Hindenlang
*Assistant Examiner* — Virak Nguon
(74) *Attorney, Agent, or Firm* — Maier & Maier, PLLC

(57) ABSTRACT

The present invention provides a manufacturing method of a molded product by which the cutting accuracy of a burr provided on the peripheral surface of the molded body can be improved. According to the present invention, provided is a manufacturing method of a molded product, comprising a measurement step; a correction step; and a burr cutting step, wherein, in the measurement step, a position of at least one point on a peripheral surface of a molded body is measured while the molded body is in a positioned state, in the correction step, a master cutting line is corrected on the basis of a measurement result in the measurement step to determine a corrected cutting line, and in the burr cutting step, a burr provided on the peripheral surface of the molded body is cut according to the corrected cutting line.

8 Claims, 12 Drawing Sheets

(56) References Cited

FOREIGN PATENT DOCUMENTS

| JP | 06344121 A | * | 12/1994 |
|----|------------|---|---------|
| JP | H06-344121 A | | 12/1994 |
| JP | 08112646 A | * | 5/1996 |
| JP | H08112646 A | | 5/1996 |
| JP | 2020-001100 A | | 1/2020 |

OTHER PUBLICATIONS

Office Action issued on Jul. 4, 2023, in corresponding Japanese Application No. 2020-020864, 8 pages.

* cited by examiner

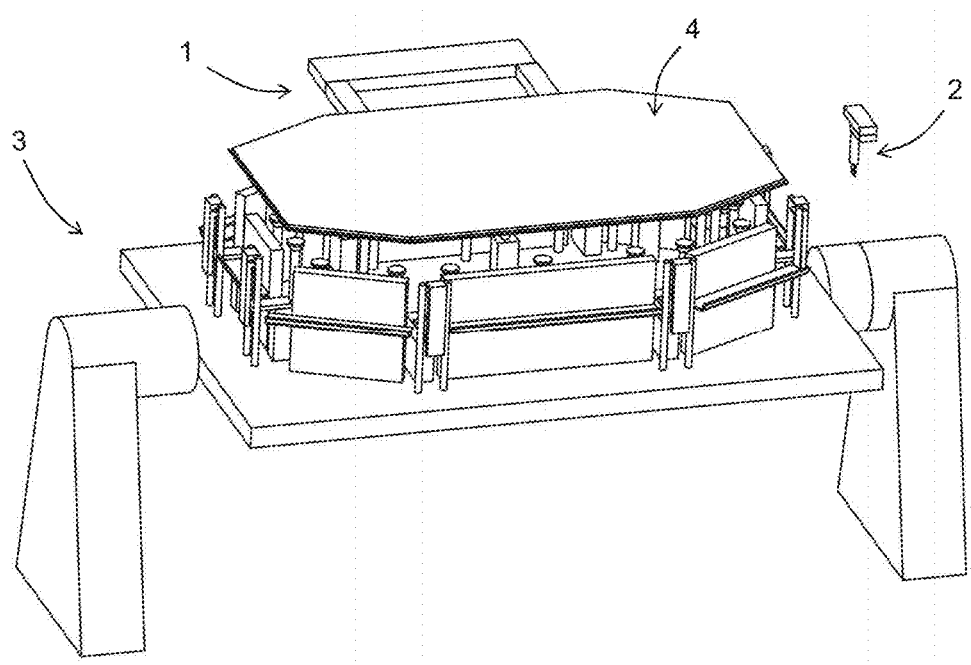

MOLDED ARTICLE MANUFACTURING METHOD

TECHNICAL FIELD

The present invention relates to a manufacturing method of a molded product.

BACKGROUND ART

Patent Literature 1 discloses a technique for removing a burr provided on a peripheral surface of a molded body by cutting it with a cutter.

CITATION LIST

Patent Literature

Patent Literature 1: JP-A-2020-1100

SUMMARY OF INVENTION

Technical Problem

In the method of Patent Literature 1, the burr is cut along a specific cutting line set by teaching. In this method, the accuracy of burr cutting may decrease when the molded body is positioned in an inclined state or when there are variations in the degree of contraction of the molded body.

The present invention has been made in view of such circumstances and provides a manufacturing method of a molded product by which the cutting accuracy of a burr provided on the peripheral surface of the molded body can be improved.

Solution to Problem

According to the present invention, provided is a manufacturing method of a molded product, comprising a measurement step; a correction step; and a burr cutting step, wherein, in the measurement step, a position of at least one point on a peripheral surface of a molded body is measured while the molded body is in a positioned state, in the correction step, a master cutting line is corrected on the basis of a measurement result in the measurement step to determine a corrected cutting line, and in the burr cutting step, a burr provided on the peripheral surface of the molded body is cut according to the corrected cutting line.

In the present invention, a position of at least one point on the peripheral surface of the molded body is measured, the cutting line is corrected on the basis of the measurement result, and the burr is cut according to the corrected cutting line. Consequently, the burr can be cut with high accuracy even when the molded body is positioned in an inclined state or when there are variations in the degree of contraction of the molded body.

Hereinafter, various embodiments of the present invention will be exemplified.

Preferably, in the measurement step, at least one of an inclination amount and an expansion and contraction amount of the molded body is measured, and in the correction step, at least one of the inclination amount and the expansion and contraction amount of the master cutting line is corrected on the basis of the measurement result in the measurement step.

Preferably, the expansion and contraction amount is corrected by parallel transport of a portion of a cutting line before correction.

Preferably, the burr is cut by moving a cutter for cutting the burr while pressing the cutter against the peripheral surface.

Preferably, provided is a manufacturing method of a molded product, comprising: a burr cutting step; and a burr removal step, wherein in the burr cutting step, a burr provided on a peripheral surface of a molded body is cut and dropped onto a burr processing table, and in the burr removal step, the burr is removed from the burr processing table by rotating the burr processing table.

Preferably, in the burr removal step, the burr processing table is rotated by 90 degrees or more.

Preferably, the burr processing table comprises a molded-body placing body and a burr receiving portion, the burr receiving portion is provided at a position adjacent to the molded-body placing body and lower than an upper surface of the molded-body placing body, and in the burr cutting step, the burr is cut and dropped onto the burr receiving portion while the molded body is fixed to the upper surface of the molded-body placing body.

Preferably, the method comprises a positioning step before the burr cutting step, wherein, in the positioning step, the molded body is positioned by moving the molded body in a state where the molded body is placed on a suction pad and air is blown from the suction pad toward the molded body.

Preferably, the method comprises a positioning step before the burr cutting step, wherein, in the positioning step, the molded body is positioned by pressing the peripheral surface of the molded body with a positioning block to move the molded body, and the positioning block comprises a positioning surface configured to abut against the peripheral surface of the molded body and an interference avoiding groove configured to avoid interference with the burr.

Preferably, in the burr cutting step, the burr is cut along a cutting line determined on the basis of an inclination amount and an expansion and contraction amount of the molded body.

BRIEF DESCRIPTION OF DRAWINGS

FIG. 4 is a perspective view corresponding to FIG. 2A to explain a loading step.

DESCRIPTION OF EMBODIMENTS

Hereinafter, embodiments of the present invention will be described. Various characteristics described in the embodiments described below can be combined with each other. Further, the invention is independently established for each characteristic.

1. Manufacturing System 10 of Molded Product 4b

As shown in FIG. 1A to FIG. 2B, a manufacturing system 10 of a molded product 4b in one embodiment of the present invention includes a moving robot hand 1, a cutting robot hand 2, and a burr processing table 3.

Figure 1A:
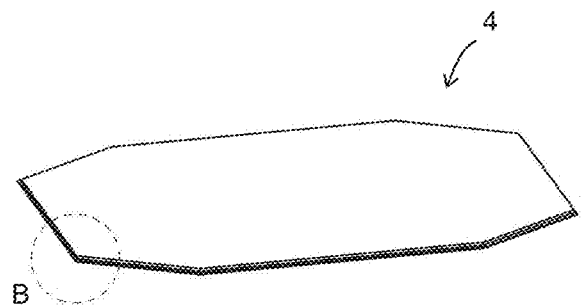
FIG. 1A is a perspective view of a molded body 4.
Figure 1B:
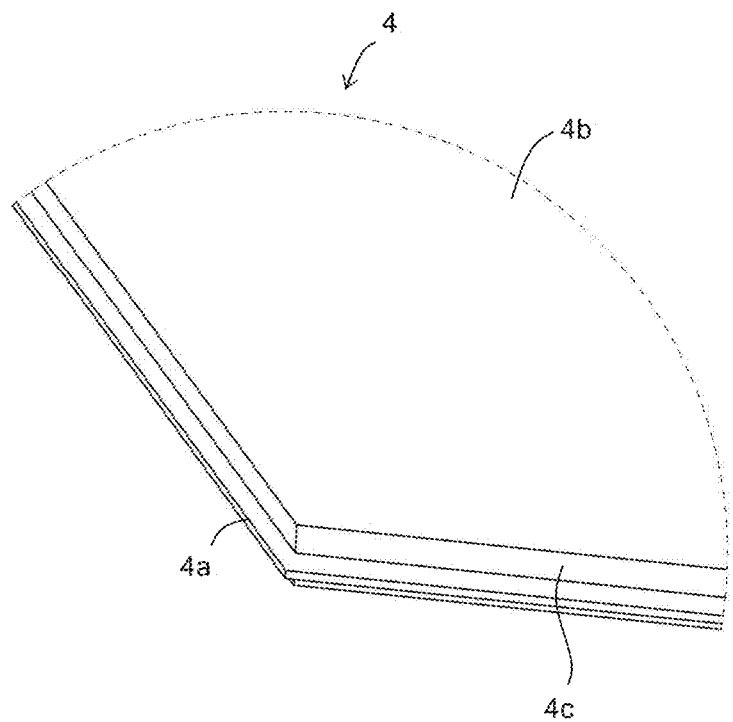
FIG. 1B is an enlarged view of a region B in FIG. 1A.

The manufacturing system 10 is used to obtain the molded product 4b by cutting a burr 4a provided on a peripheral surface 4c of a molded body 4 shown in FIG. 1A and FIG. 1B. The molded body 4 is a molded body formed using a pair of split molds and may be any of a blow molded body, a vacuum molded body, an injection molded body and the like. The burr 4a is formed on a mating surface of the split molds. Further, the molded body 4 may be in a state immediately after removal from the opened split molds or may be in a state after a pre-process is performed on the molded body obtained by opening the split molds.

The pre-process may include removing a part of burr formed during molding using the split molds. In particular, when the molded body is formed by a method, such as blow molding or vacuum molding, in which a molded body is formed by sandwiching a parison or resin sheets between the split molds, a large burr tends to be formed around the molded product 4b, and thus it is preferable to perform a process, as the pre-process, for removing a portion of the burr formed during molding other than the burr 4a.

The molded product 4b is, in one example, a board-shaped member, such as a luggage board. The molded product 4b may be used as it is as a final product, or a post-process may be performed on the molded product 4b to obtain a final product.

The robot hands 1, 2 are used in a state where they are attached to a robot arm of a robot (not shown). The robot arm has a function for moving the robot hand 1. The number of axes of the robot arm needs to be sufficient to realize various steps described later and is preferably 6 axes or more.

The robot hand 1 is used to hold the molded body 4 formed in the previous step and move it on the burr processing table 3. The robot hand 1 includes a base 1a, arms 1b, and suction pads 1c. The base 1a is attached to the robot arm. The arm 1b is provided to extend from the base 1a. The arms 1b are in an elongated shape and provided in pairs. The suction pad 1c is configured to suction the molded body 4 by vacuum suction. The suction pad 1c is provided on the arm 1b. A plurality of suction pads 1c (three in the present embodiment) is provided on each of the arms 1b.

In one example, of the three suction pads 1c provided on each of the arms 1b, two suction pads 1c on a side of a tip 1b1 are connected to a first vacuum system, and the remaining one suction pad 1c is connected to a second vacuum system. According to this configuration, the molded body 4 can be suctioned by operating the first and second vacuum systems if the molded body 4 has a size that can be suctioned by the three suction pads 1c, while the molded body 4 can be suctioned by the two suction pads 1c on the side of the tip by operating only the first vacuum system if the molded body 4 is relatively small and cannot be suctioned by the three suction pads 1c. Consequently, air leakage can be prevented when suctioning a small-sized molded body 4.

The robot hand 2 includes a base 2a, a cutter 2b, and a distance measuring device 2c. The cutter 2b and the distance measuring device 2c are fixed to the base 2a. The cutter 2b is, for example, an ultrasonic cutter, and is used to cut the burr 4a by moving the cutter 2b along the peripheral surface 4c of the molded body 4 at the boundary between the burr 4a and the molded product 4b. The cutter 2b can be biased in a direction orthogonal to a width direction of a blade of the cutter 2b, so that the cutter 2b can be moved while being pressed against the peripheral surface 4c to cut the burr 4a. The cutter 2b can be biased by a spring or a cylinder mechanism. The distance measuring device 2c is used to measure the distance between the distance measuring device 2c and the peripheral surface 4c of the molded body 4. By using the distance measuring device 2c to measure the distance at a plurality of measurement points along the peripheral surface 4c of the molded body 4 while the molded body 4 is fixed to the burr processing table 3, coordinates of the plurality of measurement points along the peripheral surface 4c of the molded body 4 can be obtained. Consequently, the inclination amount and the expansion and contraction amount of the molded body 4 can be calculated. The robot hand 2 is configured to cut the burr 4a along a cutting line determined on the basis of the calculated inclination amount and the expansion and contraction amount. According to this configuration, the burr 4a can be cut with high accuracy even when the molded body 4 is fixed to the burr processing table 3 in an inclined state or when there are large variations in the expansion and contraction amount of the molded body 4.

The number of robot hands 2 may be one or two or more. High-speed processing can be realized by performing distance measurement and cutting using a plurality of robot hands 2.

The burr processing table 3 includes a base 3a, a delivery suction unit 3b, a molded-body placing body 3c, fixing suction units 3d, positioning units 3e, a burr receiving portion 3f, a pole 3g, and a rotation unit 3h.

The rotation unit 3h includes a rotation driving portion 3h1 and a bearing portion 3h2. The base 3a is sandwiched between the rotation driving portion 3h1 and the bearing portion 3h2 and is configured to be rotationally driven by the rotation driving portion 3h1 while bearing-supported by the bearing portion 3h2. The angle of a rotation axis of the rotary drive with respect to the horizontal plane is preferably 45 degrees or less, more preferably 30 degrees or less, and even more preferably 5 degrees or less. The angle is specifically, for example, 0, 5, 10, 15, 20, 25, 30, 35, 40, 45 degrees and may be within a range between any two of the numerical values exemplified herein.

The delivery suction unit 3b includes a driving unit 3b1 and a suction pad 3b2. The driving unit 3b1 is preferably a cylinder mechanism and includes a fixed portion 3b11 fixed to the base 3a and a moving portion 3b12 configured to be movable (preferably, slidable) with respect to the fixed portion 3b11. The suction pad 3b2 is configured to suction the molded body 4 by vacuum suction and is fixed to the moving portion 3b12.

The molded-body placing body 3c is preferably a wall fixed to the base 3a, and the burr 4a is cut while the molded body 4 is placed and fixed on the molded-body placing body 3c. The molded body 4 is fixed on the molded-body placing body 3c by the fixing suction unit 3d.

A plurality of fixing suction units 3d is arranged at positions where the molded body 4 can be suctioned. The fixing suction unit 3d is preferably arranged at a position adjacent to an outer periphery of the molded body 4. In such a case, the position shift of the molded body 4 is unlikely to occur when the burr 4a is cut. Each of the fixing suction units 3d includes a support pillar 3d1 and a suction pad 3d2. The suction pad 3d2 is fixed to the support pillar 3d1, and the support pillar 3d1 is fixed to the base 3a. The suction pad 3d2 is configured to suction the molded body 4 by vacuum suction.

As shown in FIG. 2A to FIG. 3B, a plurality of positioning units 3e is arranged along the outer periphery of the molded body 4. Each of the positioning units 3e includes a pedestal 3e1, a driving unit 3e2, and a positioning block 3e3. The pedestal 3e1 is fixed to the base 3a. The driving unit 3e2 is preferably a linear slider mechanism and includes a fixed portion 3e21 fixed to the pedestal 3e1 and a moving portion 3e22 configured to be movable (preferably slidable) with respect to the fixed portion 3e21. The positioning block 3e3 is fixed to the moving portion 3e22. The driving unit 3e2 moves the positioning block 3e3, and the positioning block 3e3 pushes the peripheral surface 4c of the molded body 4 to move the molded body 4, so that the molded body 4 is positioned. The positioning block 3e3 includes a positioning surface 3e31 that abuts against the peripheral surface 4c of the molded body 4 and an interference avoiding groove 3e32 for avoiding interference with the burr 4a.

Figure 2A:
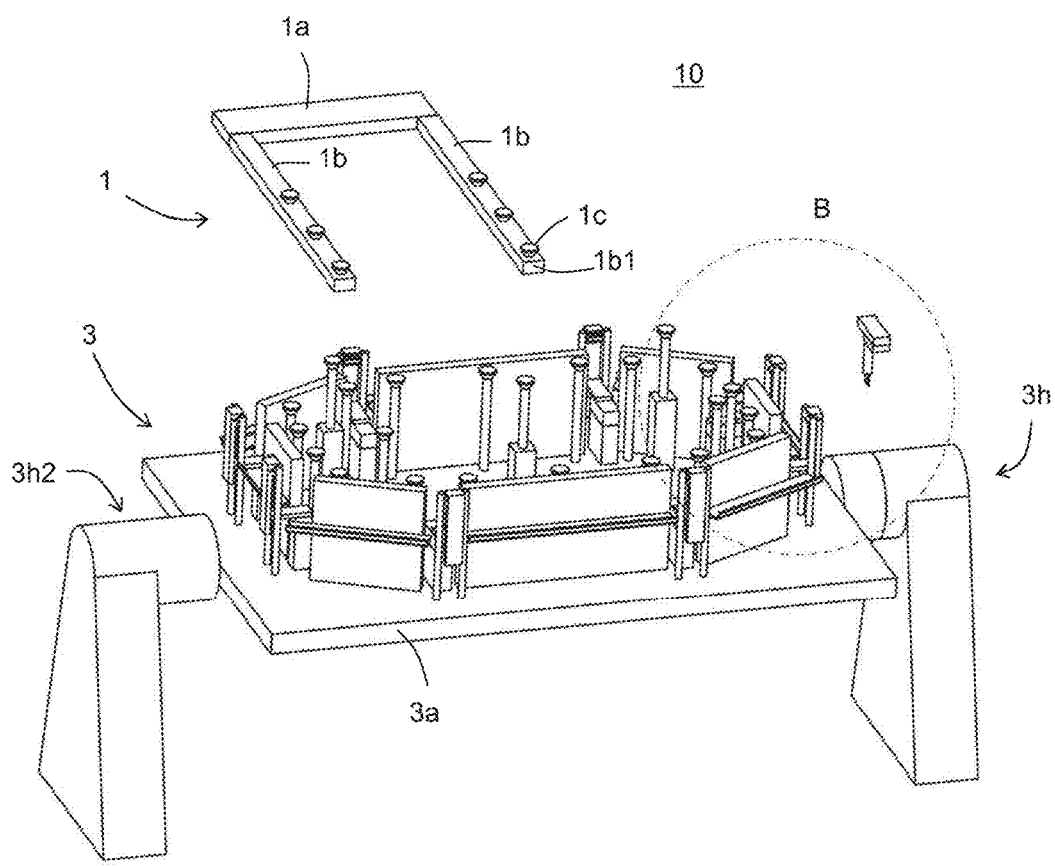
FIG. 2A is a perspective view of a manufacturing system 10 of a molded product 4b.
Figure 2B:
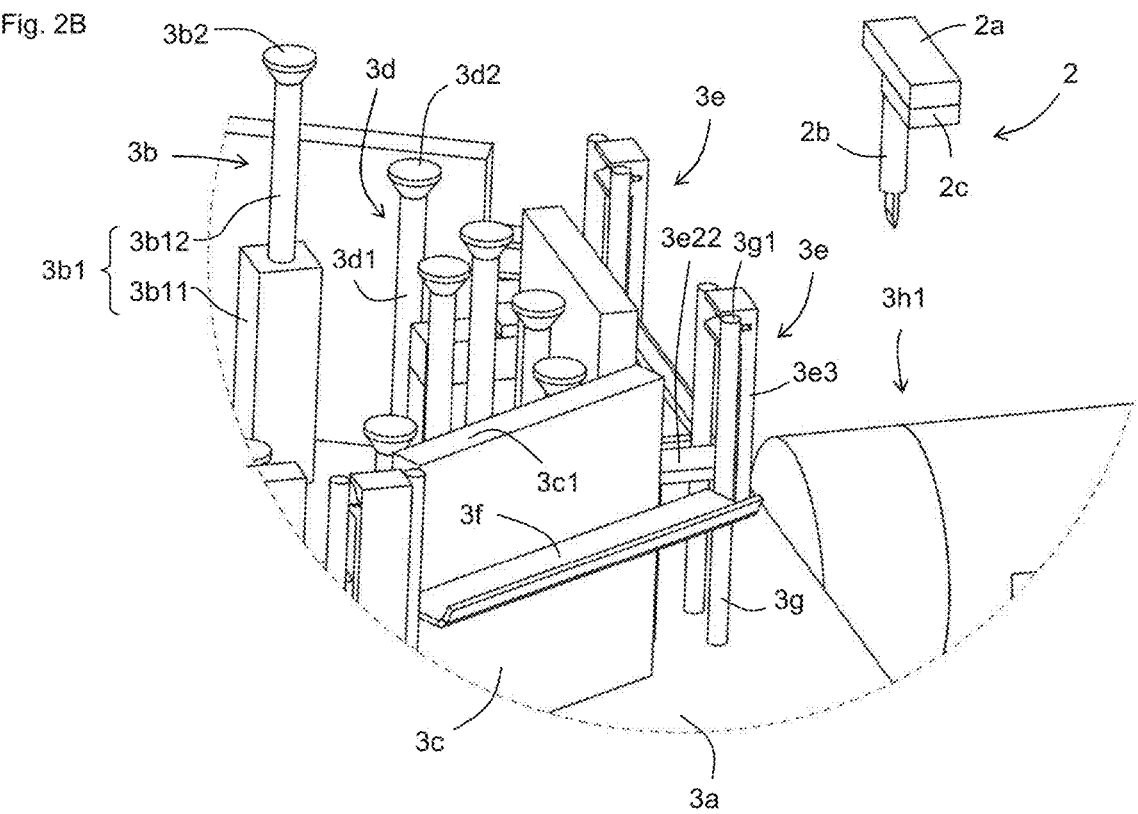
FIG. 2B is an enlarged view of the region B in FIG. 2A.

As shown in FIG. 2B, the burr receiving portion 3f is provided at a position adjacent to the molded-body placing body 3c and lower than an upper surface 3c1 of the molded-body placing body 3c. Consequently, the burr 4a can be cut and dropped onto the burr receiving portion 3f while the molded body 4 is fixed to the upper surface 3c1 of the molded-body placing body 3c. The wiring and piping necessary for driving various units are arranged around the molded-body placing body 3c, and if the burr 4a gets entangled with the wiring and piping, it may cause a problem. In the present embodiment, such a problem is avoided by allowing the burr 4a to fall onto the burr receiving portion 3f. The burr 4a on the burr receiving portion 3f can be removed by rotating the burr processing table 3 by the rotation unit 3h and dropping the burr 4a. A conveyor (not shown) may be installed below the burr processing table 3. In such a case, the burr 4a can be dropped onto the conveyor and discarded or moved to a recycling line by the conveyor.

As shown in FIG. 2B, the burr receiving portion 3f is arranged at the same height as the moving portion 3e22 or higher than it. Consequently, it is possible to prevent the dropped burr 4a from being caught by the moving portion 3e22. The position where the burr receiving portion 3f is fixed is not limited, and the burr receiving portion 3f may be fixed, for example, to the base 3a or to the molded-body placing body 3c.

Figure 10A:
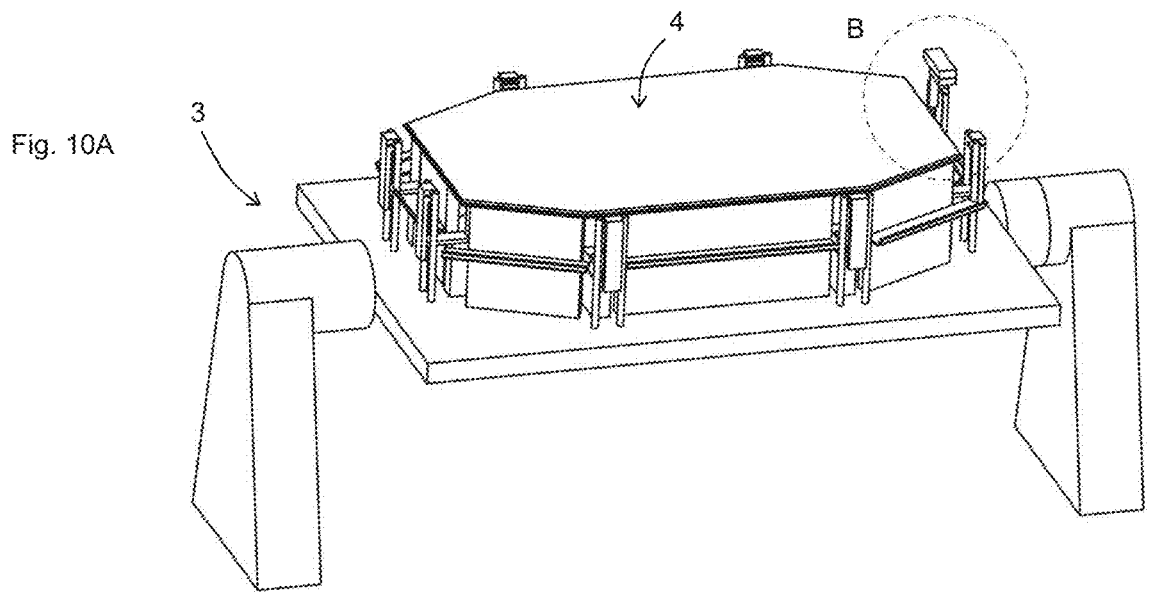
FIG. 10A is a perspective view corresponding to FIG. 2A to explain a burr cutting step.
Figure 10B:
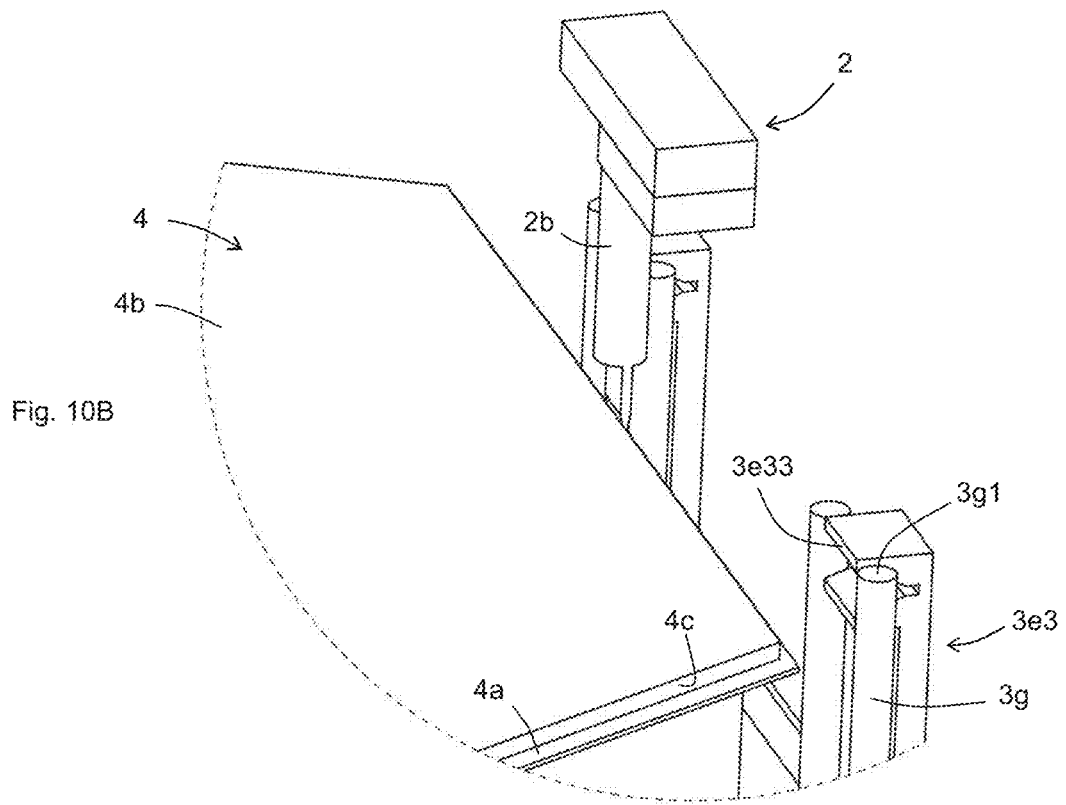
FIG. 10B is an enlarged view of the region B in FIG. 10A.

As shown in FIG. 2B, the pole 3g is fixed to the base 3a at a position adjacent to the positioning block 3e3. As shown in FIG. 10B, in a state where the molded body 4 is placed on the upper surface 3c1 of the molded-body placing body 3c, an upper end 3g1 of the pole 3g is positioned higher than the burr 4a. As shown in FIG. 10B, when cutting the burr 4a, the positioning block 3e3 is retracted so that a tip 3e33 of the positioning block 3e3 is located farther from the burr 4a than the pole 3g. Consequently, the burr 4a is prevented from being caught by the positioning block 3e3. Although the pole 3g preferably has a cylindrical shape, it may have a different shape as long as the above object can be achieved.

2. Manufacturing Method of Molded Product

A manufacturing method of the molded product 4b using the manufacturing system 10 will be described. This method includes a loading step, a positioning step, a cutting line determination step, a burr cutting step, an unloading step, and a burr removal step. Hereinafter, each step will be described.

2-1. Loading Step

As shown in FIG. 2A to FIG. 5B, in the loading step, the molded body 4 is loaded onto the burr processing table 3 by using the robot hand 1. Specifically, the step is as follows.

In the initial state, as shown in FIG. 2B, the suction pad 3b2 of the delivery suction unit 3b is raised, and the difference in height between an upper surface of the suction pad 3b2 and the upper surface 3c1 of the molded-body placing body 3c is larger than the total height of the arm 1b and the suction pad 1c.

Figure 5A:
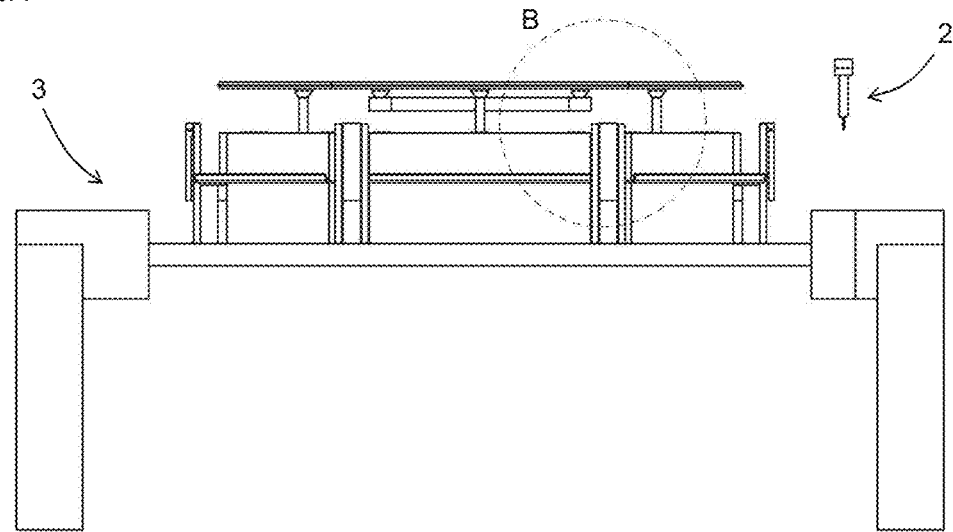
FIG. 5A is a front view of FIG. 4.
Figure 5B:
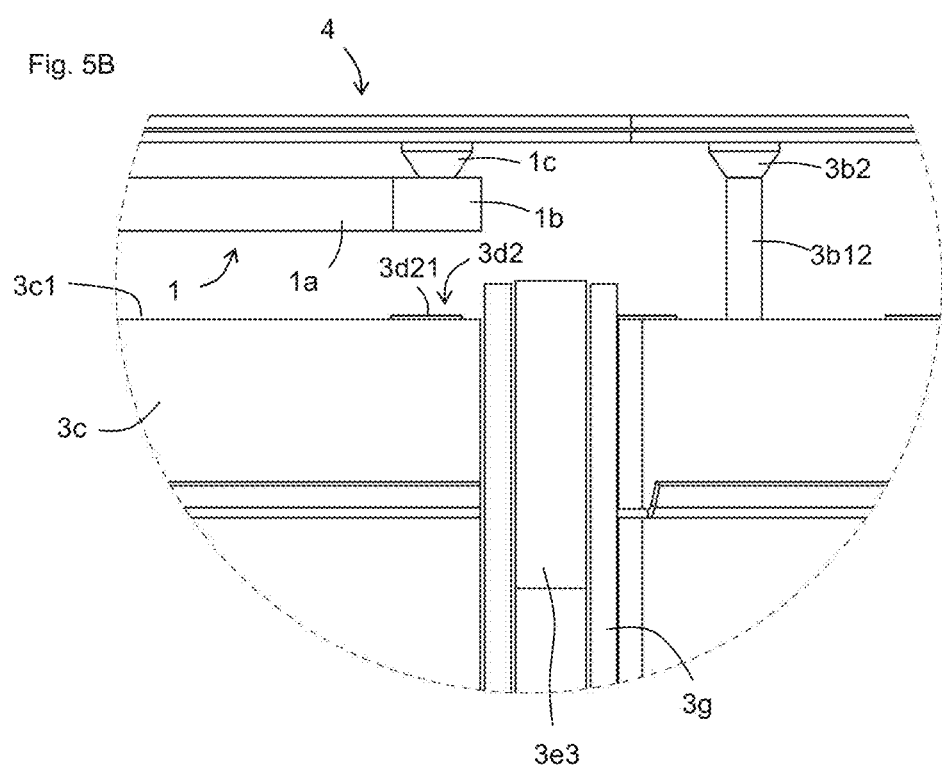
FIG. 5B is an enlarged view of the region B in FIG. 5A.

First, the molded body 4 placed on a mounting table (not shown) provided outside the burr processing table 3 is suctioned by the suction pad 1c of the robot hand 1 shown in FIG. 2A. By moving the robot hand 1 in that state, the molded body 4 is moved onto the suction pad 3b2. At this time, as shown in FIG. 5B, the robot hand 1 is moved so that the arm 1b is arranged between the molded body 4 and the molded-body placing body 3c. Consequently, since the molded body 4 is located on above the arm 1b, it is possible to prevent the molded body 4 from being unintentionally detached from the suction pad 1c.

Then, the molded body 4 is suctioned by the suction pad 3b2 and is released from the suction by the suction pad 1c, and the arm 1b is separated from the space between the molded body 4 and the molded-body placing body 3c.

2-2. Positioning Step

As shown in FIG. 6A to FIG. 7B, in the positioning step, the molded body 4 is positioned by moving the molded body 4 on the burr processing table 3. Specifically, the step is as follows.

Figure 6A:
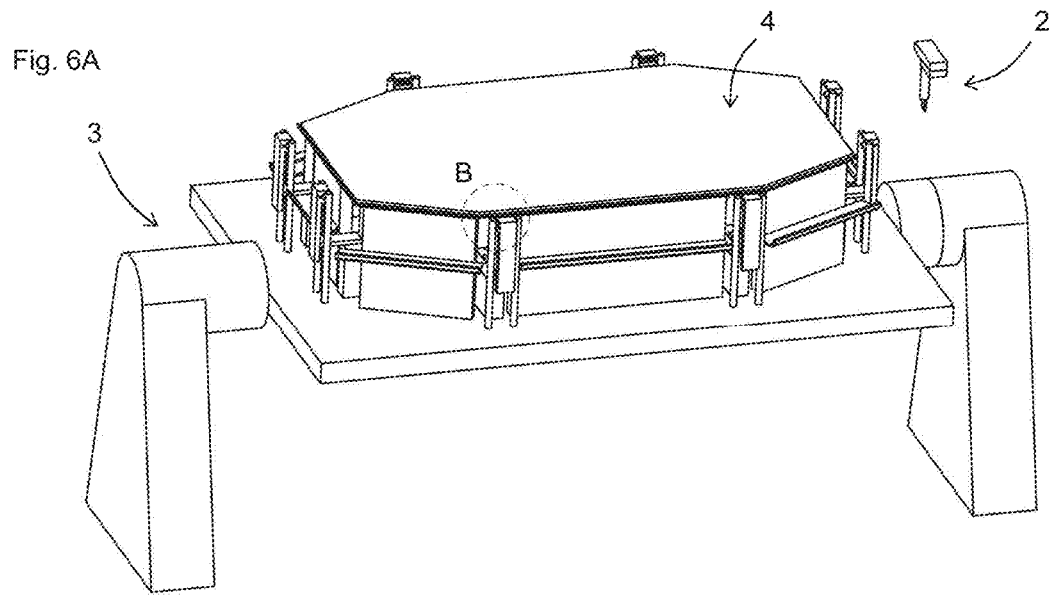
FIG. 6A is a perspective view corresponding to FIG. 2A to explain a positioning step.
Figure 6B:
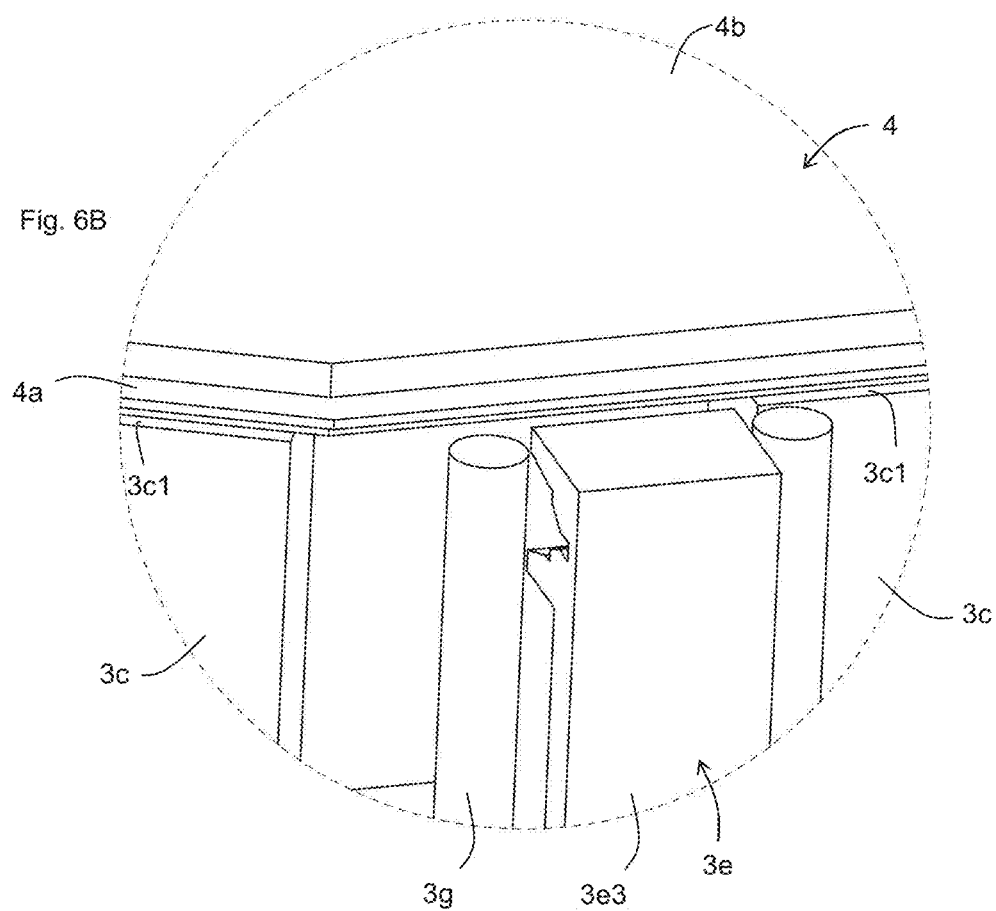
FIG. 6B is an enlarged view of the region B in FIG. 6A.

First, as shown in FIG. 6B, while the positioning block 3e3 of the positioning unit 3e is retracted, the driving unit 3b1 shown in FIG. 2B is driven to lower the suction pad 3b2, the molded body 4 is brought into contact with the suction pad 3d2, and the suction by the suction pad 3b2 is released. In this state, the molded body 4 is placed on the suction pad 3d2. As shown in FIG. 5B, since an upper surface 3d21 of the suction pad 3d2 is located slightly higher than the upper surface 3c1 of the molded-body placing body 3c, the molded body 4 is not in contact with the upper surface 3c1 of the molded-body placing body 3c or is in contact with the upper surface 3c1 of the molded-body placing body 3c in a state where at least a part of the load of the molded body 4 is applied to the suction pad 3d2.

When the molded body 4 in this state is moved in an in-plane direction (that is, the in-plane direction of a surface formed by a plurality of suction pads 3d2), the molded body 4 is slid on the suction pad 3d2. In a state where the load of the molded body 4 is applied to the suction pad 3d2, the frictional force between the molded body 4 and the suction pad 3d2 is large, and the suction pad 3d2 may be deformed when the molded body 4 is moved. If the suction pad 3d2 is deformed, the suction and fixing of the molded body 4 by the suction pad 3d2 may be insufficient.

For this reason, in the present embodiment, the molded body 4 is moved in a state where air is blown from the upper surface 3d21 of the suction pad 3d2 toward the molded body 4 to reduce the load applied from the molded body 4 to the suction pad 3d2. Consequently, the frictional force between the molded body 4 and the suction pad 3d2 is reduced, and the deformation of the suction pad 3d2 when the molded body 4 is moved is suppressed.

Figure 3A:
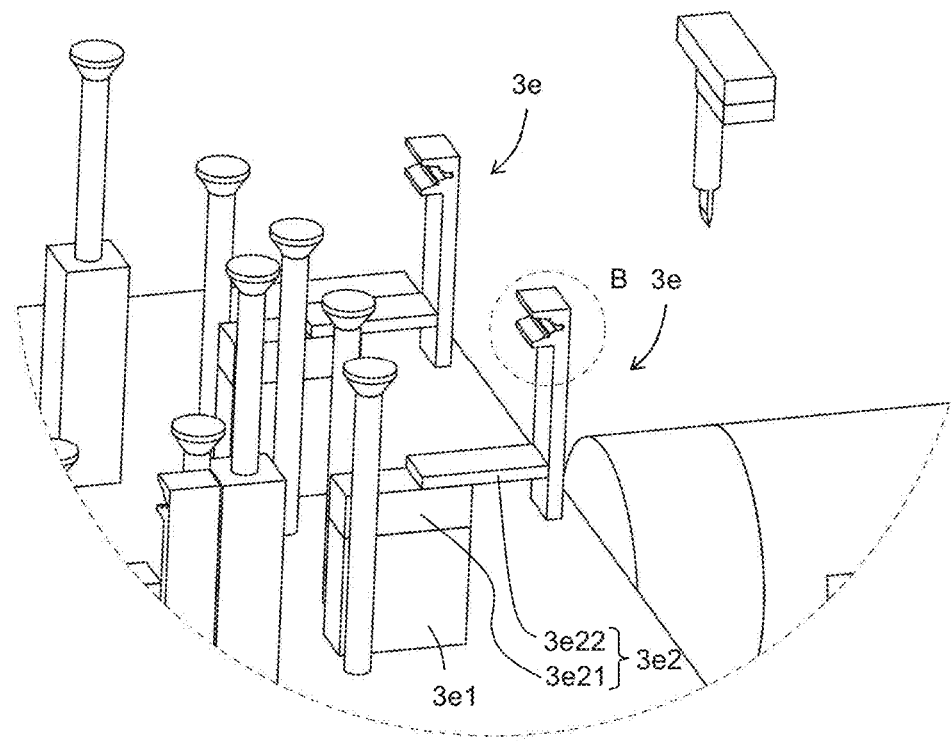
FIG. 3A is a diagram in which a molded-body placing body 3c, a burr receiving portion 3f, and poles 3g are omitted from FIG. 2B.
Figure 3B:
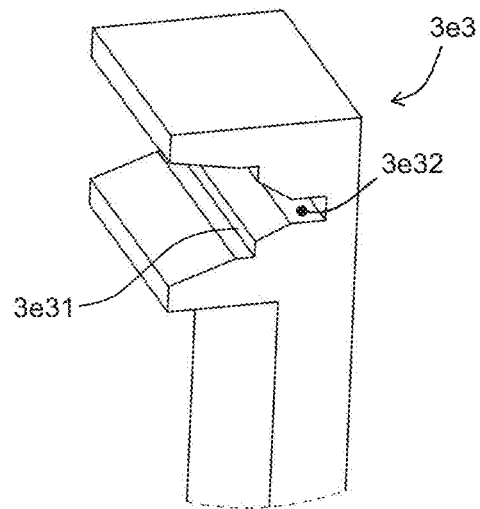
FIG. 3B is an enlarged view of the region B in FIG. 3A.
Figure 7A:
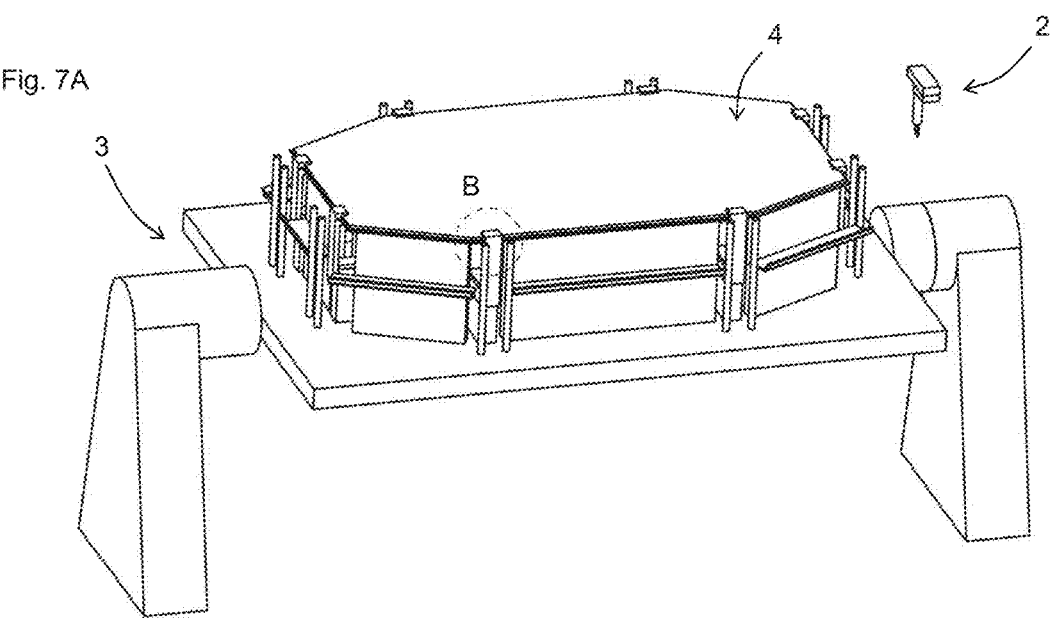
FIG. 7A is a perspective view corresponding to FIG. 2A to explain the positioning step.
Figure 7B:
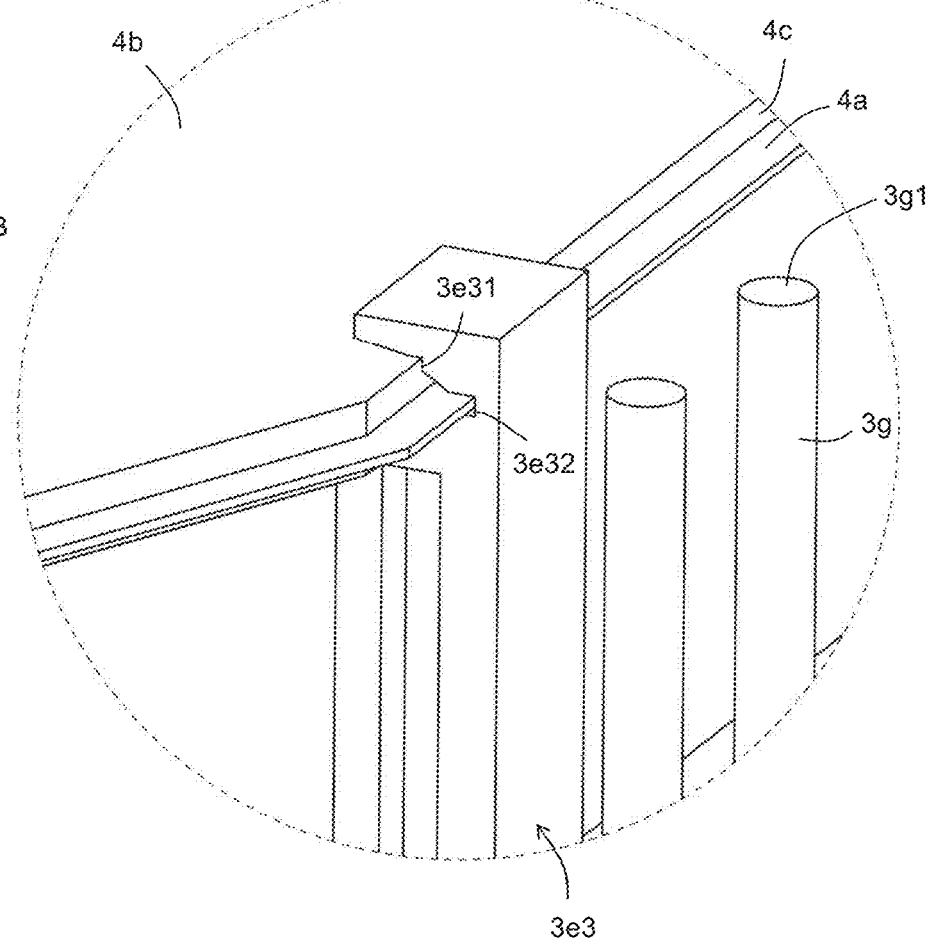
FIG. 7B is an enlarged view of the region B in FIG. 7A from a different angle.

The molded body 4 can be moved by using the positioning unit 3e. Specifically, the driving unit 3e2 shown in FIG. 3A is driven to advance the positioning block 3e3 toward the peripheral surface 4c of the molded body 4, and, as shown in FIG. 7B, the positioning surface 3e31 of the positioning block 3e3 abuts against the peripheral surface 4c of the molded body 4 to push the peripheral surface 4c, so that the molded body 4 can be moved. Further, the molded body 4 can be positioned by sandwiching the molded body 4 by a plurality of positioning blocks 3e3 of the positioning unit 3e. Further, since the burr 4a is accommodated in the interference avoiding groove 3e32 at the time of positioning, it is possible to prevent the positioning from being hindered by the burr 4a.

The method may include a step of raising the suction pad 3b2 after the completion of the positioning by the positioning block 3e3 and lifting the molded body 4 by the suction pad 3b2 to separate the molded body 4 from the suction pad 3d2 and then lowering the suction pad 3b2. By performing this step, even if the suction pad 3d2 is deformed when the molded body 4 is positioned, the suction pad 3d2 can be restored to its original shape when the molded body 4 is lifted by the suction pad 3b2.

Next, the molded body 4 is suctioned by the suction pad 3d2 to fix the position of the molded body 4. Further, the suction pad 3d2 suctions the molded body 4, so that the molded body 4 is pressed against the upper surface 3c1 of the molded-body placing body 3c. According to this configuration, the molded body 4 is stably held on the upper surface 3c1 of the molded-body placing body 3c.

After that, the driving unit 3e2 shown in FIG. 3A is driven to retract the positioning block 3e3 so as to be separated from the peripheral surface 4c of the molded body 4. At this time, as shown in FIG. 10B, the positioning block 3e3 is retracted so that the tip 3e33 of the positioning block 3e3 is located farther from the burr 4a than the pole 3g. Consequently, the burr 4a cut in the burr cutting step described later is prevented from being caught by the positioning block 3e3.

2-3. Cutting Line Determination Step

The cutting line determination step includes a measurement step and a correction step. As shown in FIG. 8A to FIG. 8D, in the measurement step, the position of at least one point on the peripheral surface 4c of the molded body 4 is measured while the molded body 4 is in a positioned state. In the correction step, a master cutting line L0 is corrected on the basis of the measurement result in the measurement step to determine a corrected cutting line L2. In one example, as shown in FIG. 8A to FIG. 8D, in the cutting line determination step, the coordinates of a plurality of measurement points along the peripheral surface 4c of the molded body 4 are measured while the molded body 4 is fixed to the burr processing table 3. The inclination amount and the expansion and contraction amount of the molded body 4 are calculated on the basis of the measured coordinates, and the corrected cutting line L2 for cutting the burr 4a is determined on the basis of the calculated inclination amount and expansion and contraction amount.

The coordinate can be measured by using the distance measuring device 2c. Since the coordinate and orientation of the distance measuring device 2c itself are known, the coordinate of the measurement point can be obtained by measuring the distance from the distance measuring device 2c to the measurement point on the peripheral surface 4c.

Here, the cutting line determination method will be specifically described.

Figure 8A:
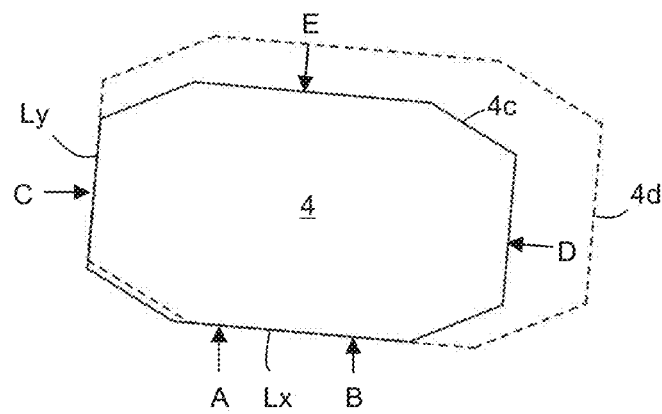
FIG. 8A is explanatory diagrams of a cutting line determination step.
Figure 8B:
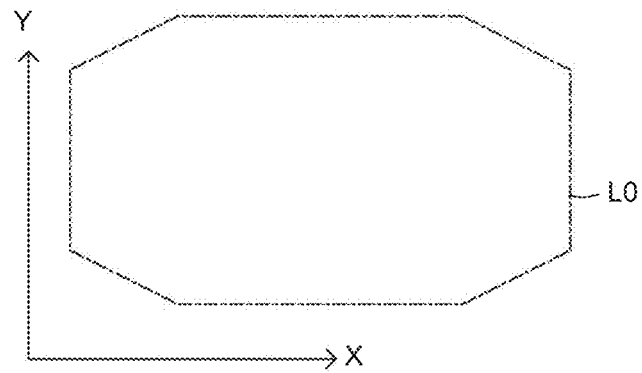
FIG. 8B is explanatory diagrams of a cutting line determination step.

The master cutting line L0 as a reference is taught and stored in the robot to which the robot hand 2 is attached, on the basis of the coordinate of the XY axes shown in FIG. 8B. The master cutting line L0 can be determined by teaching the robot a cutting line using a master workpiece. As the master workpiece, a cooled molded body may be used, or a molded body immediately after molding may be used. The former case has the advantage that the dimensions do not change during a teaching operation. The latter case has the advantage that the temperature and dimensions are similar to those of the molded body when the burr cutting step is actually performed, and thus the accuracy of burr cutting is improved. Therefore, it is preferable to first tentatively determine the master cutting line by teaching using the cooled molded body and then finely adjust the tentatively determined master cutting line using the molded body immediately after molding to improve accuracy. Further, it is preferable to arrange the master cutting line L0 so that the intersection of the straight line parallel to the X-axis and the straight line parallel to the Y-axis among the master cutting line L0 coincides with the origin of the XY coordinates.

Further, the master cutting line L0 may be changed on the basis of the historical data in the past cycle. For example, the immediately preceding corrected cutting line L2 may be used as the master cutting line L0 to perform the next cycle, or the cutting line obtained by averaging a plurality of corrected cutting lines L2 in the past may be used as the master cutting line L0 to perform the next cycle.

The master cutting line L0 is a cutting line when the molded body 4 is fixed to the burr processing table 3 without tilting in the plane and the molded body 4 has a standard size. In reality, however, the molded body 4 may be inclined when it is fixed to the burr processing table 3, and there are also variations in the expansion and contraction amount when the molded body 4 is cooled. Therefore, when the burr 4a is cut along the master cutting line L0, the burr 4a may be insufficiently removed, or the molded product 4b may be damaged. For this reason, it is necessary to correct the master cutting line L0 on the basis of the inclination amount and the expansion and contraction amount of the molded body 4. Hereinafter, an example of a cutting line correction method will be described by taking as an example a case where the molded body 4 is fixed to the burr processing table 3 in an inclined state and the molded body 4 is smaller than the standard size of the molded body 4.

First, the coordinates of measurement points A to C shown in FIG. 8A are acquired. A straight line Lx connecting the measurement points A and B and a straight line Ly passing through the measurement point C and orthogonal to the straight line Lx can be obtained on the basis of the coordinates of the measurement points A to C.

Figure 8C:
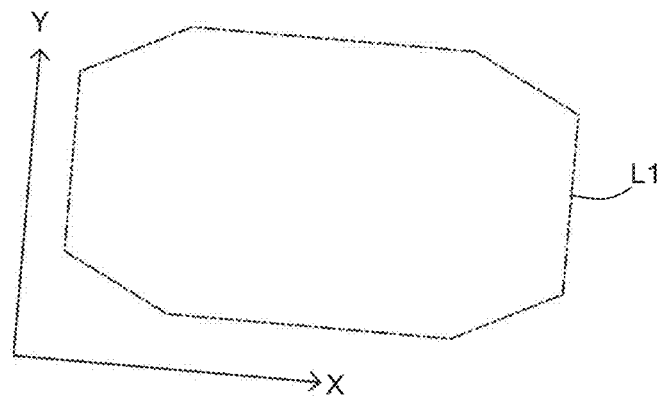
FIG. 8C is explanatory diagrams of a cutting line determination step.

Next, as shown in FIG. 8C, the XY axes of the robot are rotated so that the XY axes of the robot coincide with the straight lines Lx, Ly. Consequently, the master cutting line L0 is also rotated to become a corrected cutting line L1.

Next, the coordinates of measurement points D and E shown in FIG. 8A are acquired. The expansion and contraction amount of the molded body 4 respectively in the X-axis direction and the Y-axis direction can be obtained on the basis of the coordinates of the measurement points D and E.

Figure 8D:
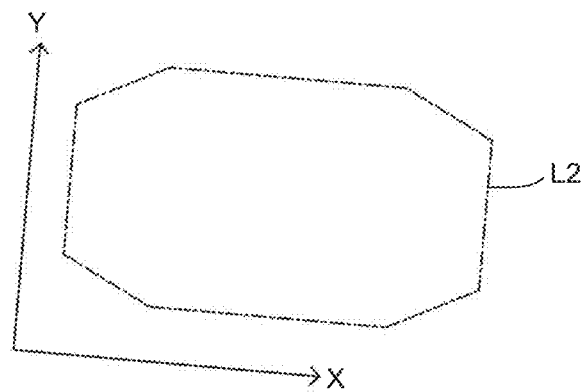
FIG. 8D is explanatory diagrams of a cutting line determination step.

Next, as shown in FIG. 8D, the corrected cutting line L2 can be obtained by expanding and contracting the corrected cutting line L1 on the basis of the expansion and contraction amount respectively in the X-axis direction and the Y-axis direction. In this regard, instead of obtaining the expansion and contraction amount respectively in the two axes, the corrected cutting line L2 may be obtained by acquiring one expansion and contraction amount and expanding and contracting the corrected cutting line L1 on the basis of the expansion and contraction amount while maintaining similarity.

Since the corrected cutting line L2 is a cutting line determined on the basis of the inclination amount and the expansion and contraction amount of the molded body 4, the burr 4a can be appropriately removed by cutting the burr 4a along the corrected cutting line L2.

In the above description, both the inclination amount and the expansion and contraction amount of the molded body 4 are measured, and both the inclination amount and the expansion and contraction amount of the master cutting line L0 are corrected on the basis of the measurement results. However, only one of the inclination amount and the expansion and contraction amount may be measured and corrected.

The expansion and contraction amount may be corrected by multiplying the values of the X coordinate and the Y coordinate of the points defining the cutting line before correction (e.g., the master cutting line L0 or the corrected cutting line L1) by a coefficient corresponding to the expansion and contraction amount. However, depending on a control program, the values of the X coordinate and the Y coordinate may not be changed simultaneously, or the coefficient may not be multiplied. In such a case, the expansion and contraction amount may be corrected by the parallel transport of a part of the cutting line before correction.

The correction of the expansion and contraction amount by the parallel transport will be described in more detail with reference to FIG. 9A and FIG. 9B.

Figure 9A:
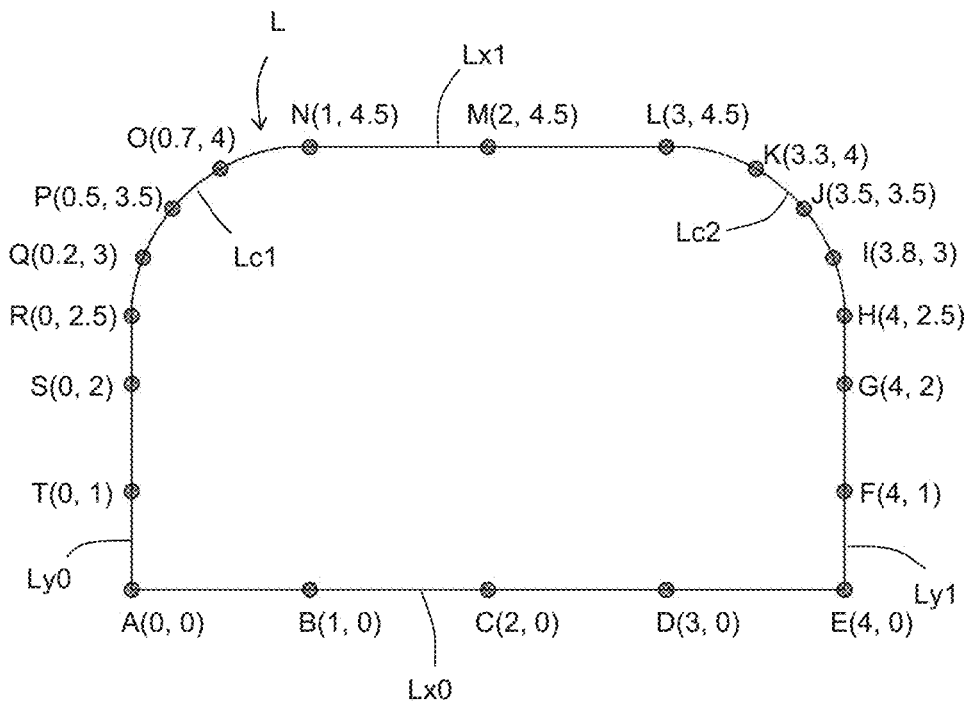
FIG. 9A shows a cutting line before correction.
Figure 9B:
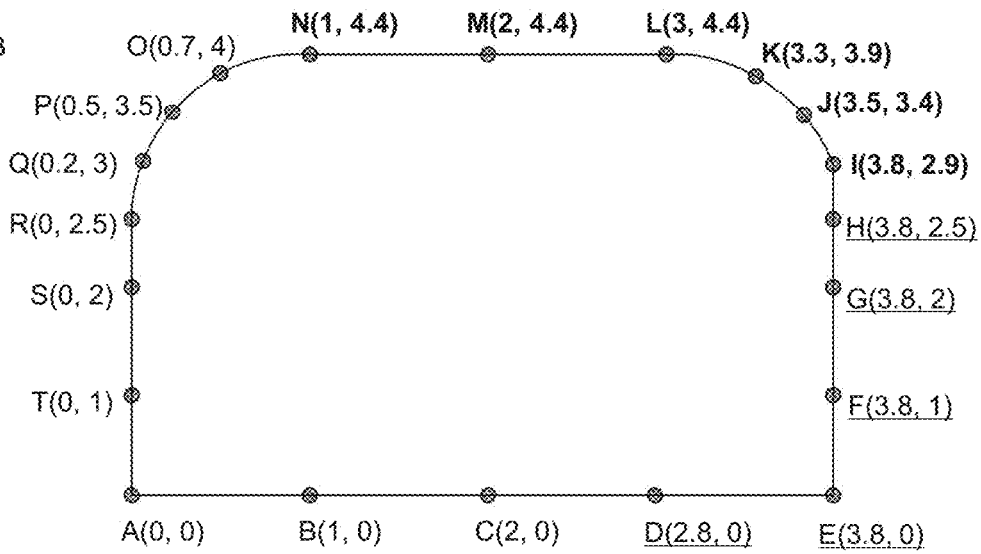
FIG. 9B shows the cutting line after correction.

FIG. 9A shows a cutting line L before correction. The cutting line L is a line that smoothly connects points A to T, and when the points A to T move, the cutting line L also moves. The left-right direction of FIG. 9A to FIG. 9B is the X-axis direction, and the up-down direction is the Y-axis direction. The cutting line L includes two lines Ly0, Ly1 parallel to the Y-axis, two lines Lx0, Lx1 parallel to the X-axis, a curved line Lc1 connecting the line Ly0 and the line Lx1, and a curved line Lc2 connecting the line Ly1 and the line Lx1.

Here, it is assumed that the molded body 4 is 0.2 mm smaller in the X-axis direction and 0.1 mm smaller in the Y-axis direction than the standard size of the molded body 4 when the position of the peripheral surface of the molded body 4 is measured by the above-mentioned method.

In this case, the expansion and contraction in the X-axis direction can be realized by moving the line Ly1 by −0.2 mm in the X-axis direction without moving the ling Ly0. In one example, as shown in FIG. 9B, the line Ly1 can be moved by moving the X coordinates of the points D to H (underlined points) close to the line Ly1 by −0.2 mm. The point to be moved can be adjusted as appropriate. For example, the point D may not be moved, or the point I may be moved.

Further, the expansion and contraction in the Y-axis direction can be realized by moving the line Lx1 by −0.1 mm in the Y-axis direction without moving the line Lx0. In one example, as shown in FIG. 9B, the line Lx1 can be moved by moving the Y coordinates of the points I to N (points in bold) close to the line Lx1 by −0.1 mm. The point to be moved can be adjusted as appropriate. For example, the point I may not be moved, or the point O may be moved.

According to such a method, the expansion and contraction amount can be easily corrected.

Meanwhile, in the above-mentioned method, the correction may not be appropriately performed at a portion that is not parallel to either the X-axis or the Y-axis (hereinafter, referred to as a non-parallel portion, e.g., the curved lines Lc1, Lc2). However, the burr 4a can be cut by biasing the cutter 2b in the direction orthogonal to a direction in which the cutting line extends (in other words, the width direction of the blade of the cutter 2b) to move the cutter 2b while being pressed against a peripheral surface 4b1. According to such a method, the cutter 2b can be moved along the peripheral surface 4b1 even in the non-parallel portion, and thus the burr 4a can be cut with high accuracy.

2-4. Burr Cutting Step

As shown in FIG. 10A to FIG. 11B, in the burr cutting step, the burr 4a provided on the peripheral surface 4c of the molded body 4 is cut and dropped onto the burr processing table 3. Consequently, the molded body 4 is separated into the burr 4a and the molded product 4b.

Figure 11A:
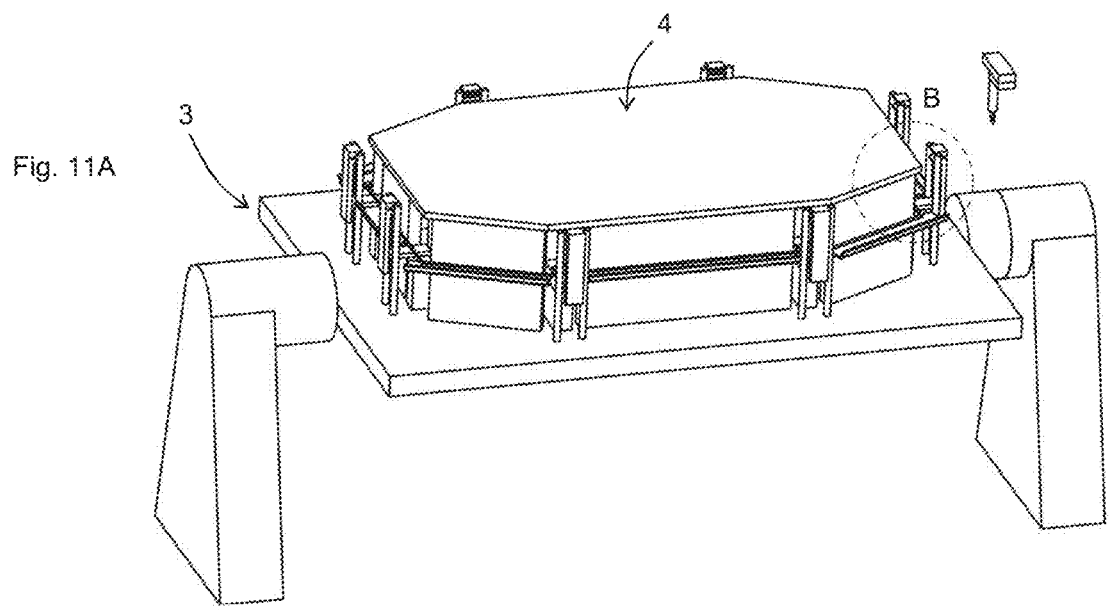
FIG. 11A is a perspective view corresponding to FIG. 2A to explain the burr cutting step.
Figure 11B:
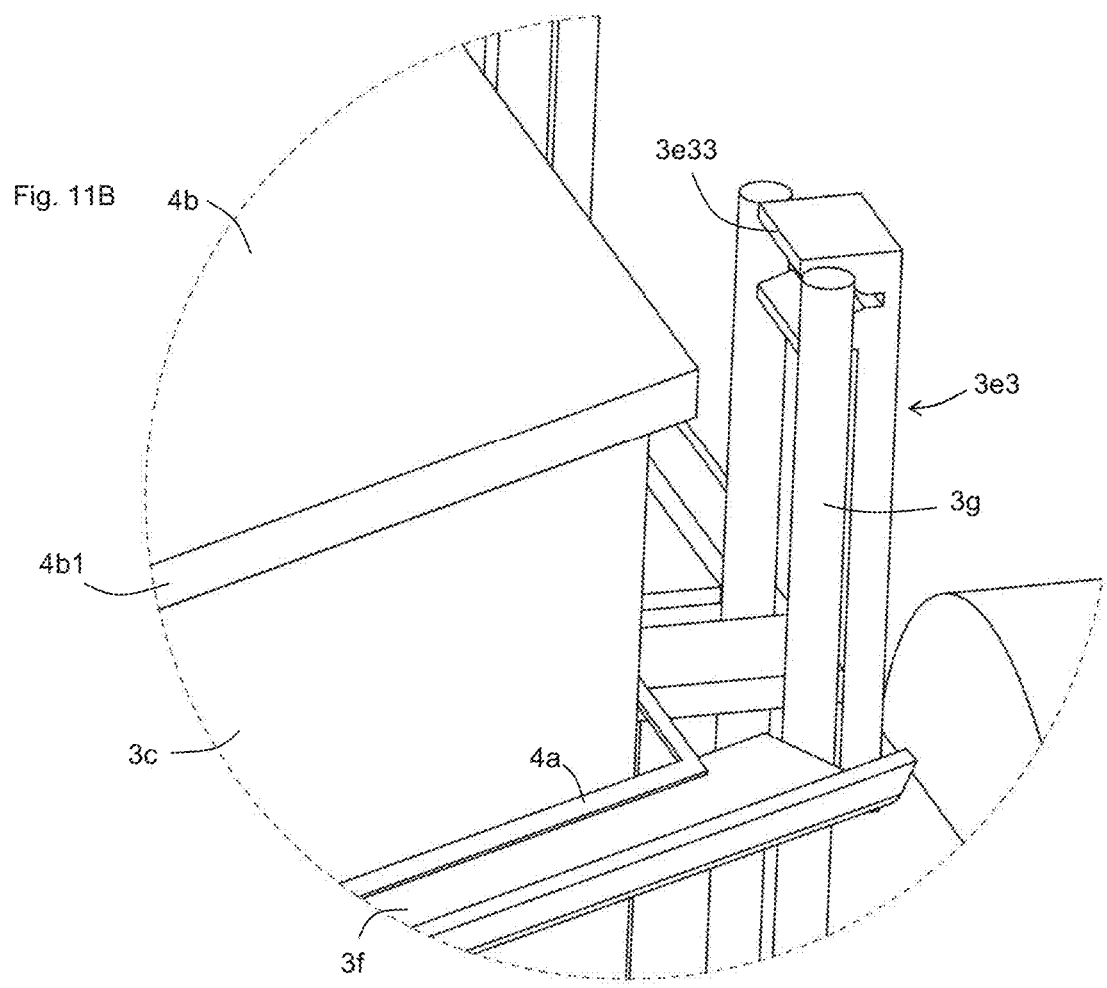
FIG. 11B is an enlarged view of the region B in FIG. 11A.

The burr 4a can be cut along the corrected the cutting line L2 determined in the cutting line determination step. As shown in FIG. 11B, the burr 4a falls on the burr receiving portion 3f. The molded product 4b is placed on the molded-body placing body 3c and is suctioned by the suction pad 3d2. The peripheral surface 4b1 of the molded product 4b coincides with the peripheral surface 4c of the molded body 4.

The burr 4a may have an annular or non-annular shape. When the cut burr 4a is thin and light, the burr 4a may not fall and may adhere to the molded product 4b due to static electricity and the like. The problem is that such a burr 4a may fall in an unintended place after the molded product 4b is unloaded from the burr processing table 3. Therefore, it is preferable to cut the burr 4a so that the thin and light burr 4a is not separated from a thicker and heavier burr 4a.

2-5. Unloading Step

In the unloading step, the molded product 4b is unloaded from the burr processing table 3.

Specifically, the suction of the molded product 4b by the suction pad 3d2 is released, the molded product 4b is suctioned by the suction pad 3b2, and the suction pad 3b2 is raised. Next, the arm 1b is inserted into the space between the molded product 4b and the molded-body placing body 3c so that the suction pad 1c faces upward (see FIG. 4). Next, the suction of the molded product 4b by the suction pad 3b2 is released, and the molded product 4b is suctioned by the suction pad 1c. Next, by moving the robot hand 1 in that state, the molded product 4b is unloaded from the burr processing table 3.

2-6. Burr Removal Step

Figure 12:
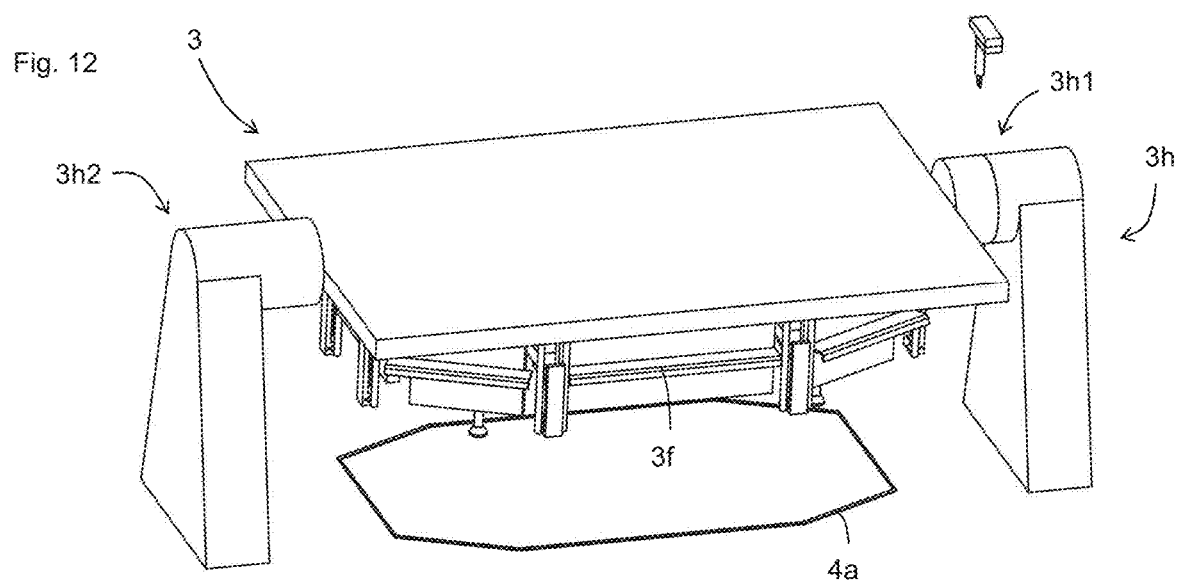
FIG. 12 is a perspective view corresponding to FIG. 2A to explain the burr removal step.

As shown in FIG. 12, in the burr removal step, the burr 4a is removed from the burr processing table 3 by rotating the burr processing table 3. Consequently, the burr 4a placed on the burr receiving portion 3f is dropped by the action of gravity and removed. The dropped burr 4a is carried by the conveyor or the like and recycled or discarded.

The burr processing table 3 is driven by the rotation driving portion 3h1 and rotates in a state of being bearing-supported by the bearing portion 3h2. The rotation angle of the burr processing table 3 is preferably 90 degrees or more, for example, 90 to 270 degrees, preferably 120 to 240 degrees, for example, 90, 120, 150, 180, 210, 240, 270 degrees, and may be within the range between any two of the numerical values exemplified herein. By rotating the burr processing table 3 at such an angle, the burr 4a can be dropped from the burr processing table 3 even when the burr 4a has an annular shape or the burr 4a has an elongated shape that can be easily caught by another member.

The burr removal step may be performed every time the burr cutting step is performed or may be performed every time the burr cutting step is performed a plurality of times.

REFERENCE SIGNS LIST

1: moving robot hand, 1a: base, 1b: arm, 1b1: tip, 1c: suction pad, 2: cutting robot hand, 2a: base, 2b: cutter, 2c: distance measuring device, 3: burr processing table, 3a: base, 3b: delivery suction unit, 3b1: driving unit, 3b11: fixed portion, 3b12: moving portion, 3b2: suction pad, 3c: molded-body placing body, 3c1: upper surface, 3d: fixing suction unit, 3d1: support pillar, 3d2: suction pad, 3d21: upper surface, 3e: positioning unit, 3e1: pedestal, 3e2: driving unit, 3e21: fixed portion, 3e22: moving portion, 3e3: positioning block, 3e31: positioning surface, 3e32: interference avoiding groove, 3e33: tip, 3f: burr receiving portion, 3g: pole, 3g1: upper end, 3h: rotation unit, 3h1: rotation driving portion, 3h2: bearing portion, 4: molded body, 4a: burr, 4b: molded product, 4b1: peripheral surface, 4c: peripheral surface, 4d: molded body, 10: manufacturing system, L0: master cutting line, L1: corrected cutting line, L2: corrected cutting line

The invention claimed is:

1. A manufacturing method of a molded product, comprising:
   a measurement step; a correction step; and a burr cutting step,
   wherein, in the measurement step, a position of at least one point on a peripheral surface of a molded body is measured while the molded body is in a positioned state,
   in the correction step, a master cutting line is corrected on the basis of a measurement result in the measurement step to determine a corrected cutting line, and
   in the burr cutting step, a burr provided on the peripheral surface of the molded body is cut according to the corrected cutting line,
   wherein, in the measurement step, an expansion and contraction amount of the molded body is measured, and
   in the correction step, the expansion and contraction amount of the master cutting line is corrected on the basis of the measurement result in the measurement step,
   wherein the expansion and contraction amount is corrected by parallel transport of a portion of a cutting line before correction.

2. The method of claim 1,
   wherein the burr is cut by moving a cutter for cutting the burr while pressing the cutter against the peripheral surface.

3. A manufacturing method of a molded product, comprising:
   a burr cutting step; and a burr removal step,
   wherein, in the burr cutting step, a burr provided on a peripheral surface of a molded body is cut and dropped onto a burr processing table, and
   in the burr removal step, the burr is removed from the burr processing table by rotating the burr processing table, wherein
   the burr processing table comprises a molded-body placing body and a fixing suction unit,
   the fixing suction unit comprises a suction pad configured to suction the molded body by vacuum suction,
   the molded body is fixed on the molded-body placing body by the fixing suction unit.

4. The method of claim 3,
   wherein, in the burr removal step, the burr processing table is rotated by 90 degrees or more.

5. The method of claim 3,
   wherein the burr processing table comprises a burr receiving portion,
   the burr receiving portion is provided at a position adjacent to the molded-body placing body and lower than an upper surface of the molded-body placing body, and
   in the burr cutting step, the burr is cut and dropped onto the burr receiving portion while the molded body is fixed to the upper surface of the molded-body placing body.

6. The method of claim 3, comprising:
   a positioning step before the burr cutting step,
   wherein, in the positioning step, the molded body is positioned by moving the molded body in a state where the molded body is placed on the suction pad and air is blown from the suction pad toward the molded body.

7. The method of claim 3, comprising:
   a positioning step before the burr cutting step,
   wherein, in the positioning step, the molded body is positioned by pressing the peripheral surface of the molded body with a positioning block to move the molded body, and
   the positioning block comprises a positioning surface configured to abut against the peripheral surface of the molded body and an interference avoiding groove configured to avoid interference with the burr.

8. The method of claim 3,
   wherein, in the burr cutting step, the burr is cut along a cutting line determined on the basis of an inclination amount and an expansion and contraction amount of the molded body.

* * * * *